Dec. 25, 1923.

W. A. CARPENTSY

LICENSE PLATE HOLDER

Filed Oct. 28, 1922

1,478,423

INVENTOR.
WILLIAM A. CARPENTSY.
BY
ATTORNEY.

Patented Dec. 25, 1923.

1,478,423

UNITED STATES PATENT OFFICE.

WILLIAM A. CARPENTSY, OF NEWARK, NEW JERSEY.

LICENSE-PLATE HOLDER.

Application filed October 28, 1922. Serial No. 597,586.

*To all whom it may concern:*

Be it known that I, WILLIAM A. CARPENTSY, a citizen of the United States, residing at Newark, in the county of Essex and State of New Jersey, have invented certain new and useful Improvements in License-Plate Holders, of which the following is a specification.

This invention relates to a license plate holder and more particularly to a novel and improved means for attachment to the conventional type of automobile bumper or guard to which the license plate is usually secured as required by the rules and regulations of automobile license laws throughout the various States.

The primary object of my invention is to provide a simple yet effective means to insure more careful automobile driving, avoid collisions with other vehicles and with pedestrians in so mounting the license plate that should collision occur, the support on which the license plate is mounted, will be broken and the license plate will fall off the bumper.

It is a very common occurrence for reckless automobilists when meeting with an accident to other machines or in colliding with a pedestrian, to make off and avoid responsibility. It is well known that most accidents occur at the front of the machine and particularly with the bumper, that if the license plate is so mounted that it will become disconnected from the bumper when forcibly struck, it will necessarily result in more careful driving and the driver of the machine will be compelled to replace the license plate and in addition, concealment of identification of the particular machine will be made more difficult and consequently tends to avoid accidents.

The gist of my invention, therefore, is to mount a fragile and destructible bar or strip on the front of the bumper and secure the license plate on the bar in any well known and convenient manner so that the license plate will become disconnected when the fragile bar is broken.

I accomplish the above objects and others which will become apparent as the description proceeds and when taken in connection with the accompanying drawings showing a preferred embodiment of my invention, wherein, Figure 1 shows a perspective view of the automobile bumper and a broken bar on which the license plate is mounted.

Figure 1:
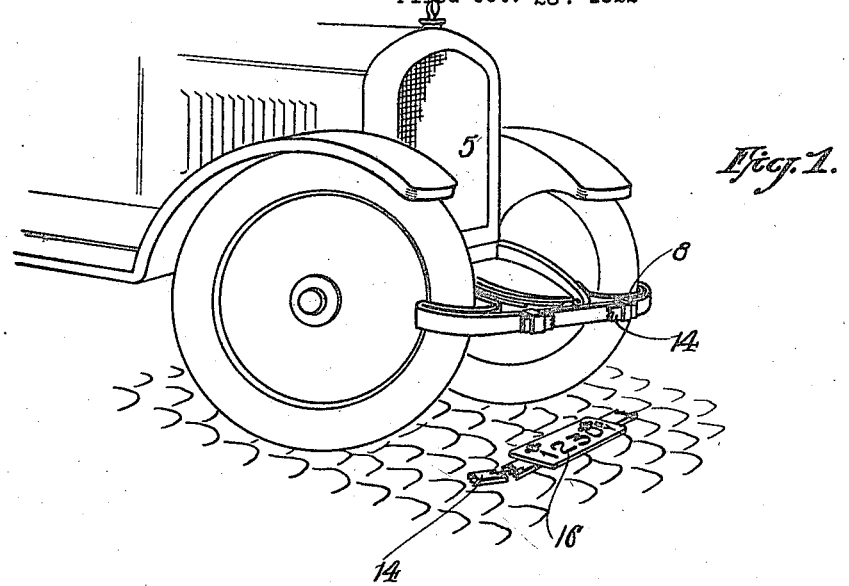
Figure 2:
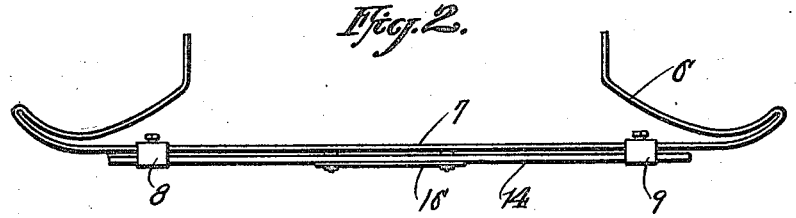
Figure 2 is a plan of the bumper and the fragile bar or strip.
Figure 3:
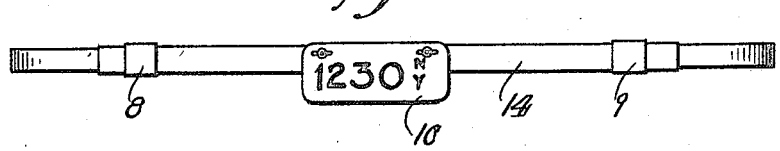
Figure 3 is a front view of the same.
Figure 4:
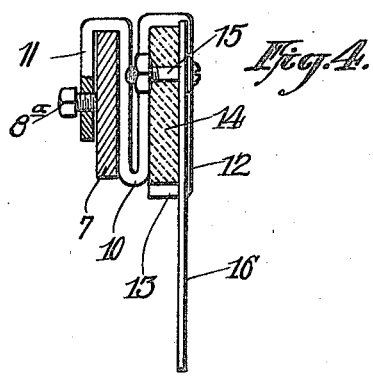
Figure 4 is a cross section through the bumper, bar and license plate.

Referring now to the drawings wherein like reference characters designate corresponding parts throughout the several views, 5 designates the conventional type of automobile on which the usual resilient bumper 6 is mounted, the latter being generally constructed of some resilient material to absorb the shock incident to collision. On the front, horizontal portion 7 of the bumper, I have provided a pair of brackets designated 8 and 9 positioned to one side of the bumper. Each of the members 8 and 9 consist of U-shaped portion 10 bent over and downwardly as at 11, behind the transverse bar 7 and secured by a set screw 8. The member 10 is also bent downwardly as at 12 and inwardly as at 13 to hold and support a fragile or destructible bar or strip 14. Any suitable fastening elements such as screw and nut 15 may be passed through the destructible member 14 to hold and support the license plate 16 as clearly shown by the drawing. In practice it has been found that different compositions of matter suitable for constructing the bar 14 such as a combination of wax, lampblack and varnish. However, many other compositions containing fusible material may be utilized for the same purpose and preferably a composition having sufficient rigidity to permit of some vibration incident to the machine passing over rough ground.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. The combination of a bumper and a license plate, a destructible bar, means for securing the lecense plate to the bar, and means for supporting and attaching the bar to the bumper.

2. The combination of a bumper and a license plate, a destructible bar extending substantially the length of the bumper, means for securing the license plate on the said bar, and a pair of brackets for supporting the bar and securing the same to the bumper.

3. The combination of a bumper and a license plate, a destructible bar, fastening elements securing the plate to the front of the bar, U-shaped brackets adjustably secured on the bumper and supporting the bar in sligthly spaced relation so that when forcibly struck, said bar will be fractured and the plate disconnected.

In testimony whereof I affix my signature,

WILLIAM A. CARPENTSY. [L. S.]